(12) United States Patent
Ji et al.

(10) Patent No.: US 12,451,491 B1
(45) Date of Patent: Oct. 21, 2025

(54) ELECTRODE SHEET, PREPARATION METHOD THEREFOR, BATTERY CELL, BATTERY, AND ELECTRIC DEVICE

(71) Applicant: CONTEMPORARY AMPEREX TECHNOLOGY CO., LIMITED, Ningde (CN)

(72) Inventors: Xing Ji, Ningde (CN); Ting Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/254,021

(22) Filed: Jun. 30, 2025

Related U.S. Application Data

(63) Continuation of application No. PCT/CN2024/092628, filed on May 11, 2024.

(30) Foreign Application Priority Data

May 22, 2023 (CN) .......................... 202310579352.6

(51) Int. Cl.
*H01M 4/62* (2006.01)
*B26D 3/08* (2006.01)
*H01M 4/04* (2006.01)
*H01M 4/66* (2006.01)

(52) U.S. Cl.
CPC .............. *H01M 4/628* (2013.01); *B26D 3/08* (2013.01); *H01M 4/0404* (2013.01); *H01M 4/661* (2013.01); *H01M 4/667* (2013.01); *H01M 4/668* (2013.01); *H01M 2220/20* (2013.01)

(58) Field of Classification Search
None
See application file for complete search history.

(56) References Cited

U.S. PATENT DOCUMENTS

| 4,767,821 A | 8/1988 | Lindner et al. |
| 2018/0244862 A1 | 8/2018 | Price |

FOREIGN PATENT DOCUMENTS

| CN | 109148888 B | 1/2021 |
| CN | 212365995 U | 1/2021 |
| CN | 114122327 A | 3/2022 |

OTHER PUBLICATIONS

The international search report of PCT Application PCT/CN2024/092628, mailed Jul. 29, 2024, 5 pages with English translation.
The ISR written opinion of PCT Application PCT/CN2024/092628, mailed Jul. 29, 2024, 5 pages with English translation.

*Primary Examiner* — Tracy M Dove
(74) *Attorney, Agent, or Firm* — K&L Gates LLP

(57) ABSTRACT

An electrode sheet, a preparation method, a battery cell, a battery, and an electric device are provided. The electrode sheet includes a current collector having a main body and a tab extending from a first end of the main body in a first direction. The main body includes a coated region and a transition region located between the coated region and the tab. An active material layer is formed on the coated region. A first insulating layer is disposed on the end face of the first end. A second insulating layer is at least partially disposed on the surface of the transition region and includes a thermoplastic polymer. The thermoplastic polymer has a volumetric particle size distribution DV50 of 6-10 μm and a maximum particle size Dmax of 90-110 μm. The electrode sheet improves the reliability of the battery cell.

20 Claims, 6 Drawing Sheets

ELECTRODE SHEET, PREPARATION METHOD THEREFOR, BATTERY CELL, BATTERY, AND ELECTRIC DEVICE

CROSS-REFERENCE TO RELATED APPLICATIONS

The present application is the continuation of PCT application PCT/CN2024/092628, filed on May 11, 2024, which claims priority to Chinese Patent Application No. 202310579352.6 entitled "Electrode Sheet, Preparation Method Therefor, Battery Cell, Battery, and Electric Device" filed on May 22, 2023, which is incorporated herein by reference in its entirety.

TECHNICAL FIELD

The present application relates to the technical field of batteries, and in particular, to an electrode sheet, a preparation method therefor, a battery cell, a battery, and an electric device.

BACKGROUND

With the increasing severity of environmental pollution, the new energy industry has been attracting growing attention. In the new energy industry, a battery technology is an important factor for the development thereof.

In the development of battery technologies, various design factors, for example, energy density, cycle life, and reliability, are taken into consideration. The design of an electrode sheet in a battery cell is crucial for the reliability of the battery cell. Thus, how to provide an electrode sheet that improves the reliability of the battery cell is an urgent technical problem to be solved.

SUMMARY

The present application has been made in view of the above problem, and an objective thereof is to provide an electrode sheet to improve the reliability of a battery cell.

In order to implement the above objective, provided in the present application are an electrode sheet, a preparation method therefor, a battery cell, a battery, and an electric device.

According to a first aspect, an electrode sheet is provided. The electrode sheet comprises a current collector, an active material layer, a first insulating layer, and a second insulating layer. The current collector comprises a main body portion and a tab, the tab extends from a first end of the main body portion, and the first end is an end of the main body portion in a first direction. The main body portion comprises a coated region and a transition region, and the transition region is disposed between the coated region and the tab. The active material layer is disposed on a surface of the coated region. The first insulting layer is disposed on an end face of the main body portion at the first end. At least part of the second insulating layer is disposed on a surface of the transition region, the second insulating layer comprises a thermoplastic polymer, volumetric particle size distribution $D_v50$ of the thermoplastic polymer is 6 μm to 10 μm, and a maximum particle size $D_{max}$ of the thermoplastic polymer is 90 μm to 110 μm.

An embodiment of the present application provides an electrode sheet. The electrode sheet comprises a current collector, an active material layer, a first insulating layer, and a second insulating layer. The current collector comprises a main body portion and a tab, the tab extends from a first end of the main body portion, and the first end of the main body portion is an end of the main body portion in a first direction. The main body portion comprises a coated region and a transition region, the transition region is disposed between the coated region and the tab, and the active material layer is disposed in the coated region. In this manner, through disposing of the transition region, in a process of cutting the tab, a cutting tool can maintain a specific distance from the active material layer, thereby reducing the detachment of the active material layer. The first insulating layer is disposed on an end face of the main body portion at the first end, so that the first insulating layer can cover the end face of the first end to reduce a risk of exposing the current collector at the end face, thereby reducing a risk of lapping between the current collector exposed at the end face and an electrode having an opposite polarity. Further, the first insulating layer can cover burrs generated in the cutting process, thereby reducing a risk of lapping between the burrs and the electrode having the opposite polarity. At least part of the second insulating layer is disposed on a surface of the transition region, and the second insulating layer comprises a thermoplastic polymer. In this manner, a cutting line is located in the transition region, and in the process of cutting the tab, the thermoplastic polymer in the second insulating layer on the surface of the transition region changes from a solid state to a flowing state after being heated. The thermoplastic polymer in the flowing state flows to the end face of the first end, and solidifies at the end face after being cooled. Volumetric particle size distribution $D_v50$ of the thermoplastic polymer is 6 μm to 10 μm, and a maximum particle size $D_{max}$ of the thermoplastic polymer is 90 μm to 110 μm. Through proper setting of a particle size of the thermoplastic polymer, the thermoplastic polymer is less likely to agglomerate, and the thermoplastic polymer has an appropriate flowing path after being heated. This facilitates the formation of a uniform and dense first insulating layer at the end face, thereby enabling uniform and dense covering of the end face. Thus, the technical solution in the embodiment of the present application can improve the reliability of a battery cell.

In a possible implementation, the volumetric particle size distribution $D_v50$ of the thermoplastic polymer is 7 μm to 8 μm, and the maximum particle size $D_{max}$ of the thermoplastic polymer is 90 μm to 100 μm. In this manner, the thermoplastic polymer is less likely to agglomerate and has a relatively appropriate flowing path after changing from a solid state to a flowing state after being heated, thereby facilitating the formation of a uniform and dense first insulating layer at the end face.

In a possible implementation, the thickness d2 of the second insulating layer is 22 μm to 48 μm. Optionally, the thickness d2 of the second insulating layer is 22 μm to 30 μm.

In the above technical solution, in a case that the thickness d2 of the second insulating layer is not less than 22 μm, there are a large quantity of thermoplastic polymers in the second insulating layer in a process of cutting the current collector provided with the second insulating layer, so that the large quantity of thermoplastic polymers can flow to burrs and an exposed end face of the current collector after being heated, which is conducive to covering the exposed end face and the burrs uniformly and densely; and in a case that the thickness d2 of the second insulating layer does not exceed 48 μm, it is conducive to reducing energy consumed in the cutting process. Optionally, when the thickness d2 of the second insulating layer is 22 μm to 30 μm, an effect of covering the exposed end face and the burrs can be improved while reducing the energy consumed for cutting.

In a possible implementation, the thickness d1 of the first insulating layer is 300 nm to 1800 nm. In this manner, the first insulating layer can cover the burrs and the exposed end face while having a small thickness. Optionally, the thickness d1 of the first insulating layer is 300 nm to 860 nm, which is conducive to further reducing the thickness of the first insulating layer while better covering the burrs and the exposed end face.

In a possible implementation, a drop melting point of the thermoplastic polymer is 80° C. to 250° C. In this manner, in a process of cutting the current collector provided with the second insulating layer, heat generated by cutting causes the thermoplastic polymer to change from a solid state to a flowing state, and the thermoplastic polymer in the flowing state can flow to the end face of the current collector exposed after being cut and burrs generated by cutting, thereby facilitating the preparation of the first insulating layer. Optionally, the drop melting point of the thermoplastic polymer is 80° C. to 150° C., which is conducive to reducing energy consumed in the cutting process.

In a possible implementation, a material of the thermoplastic polymer comprises at least one of a crystalline thermoplastic polymer or an amorphous thermoplastic polymer. Optionally, the crystalline thermoplastic polymer comprises at least one of polyethylene, polypropylene, or polyamide. Optionally, the amorphous thermoplastic polymer comprises at least one of microcrystalline wax, polystyrene, or polymethyl methacrylate.

In the above technical solution, the use of the thermoplastic polymer facilitates the formation of uniform and dense covering on the end face of the current collector exposed after being cut and the burrs.

In a possible implementation, the second insulating layer further comprises a binder. Disposing of the binder is conducive to increasing the bonding strength between the thermoplastic polymer and the current collector and reducing a risk of the detachment of the second insulating layer.

In a possible implementation, in the second insulating layer, the mass ratio A:B of the thermoplastic polymer to the binder is 60:40 to 80:20. Optionally, in the second insulating layer, the mass ratio A:B of the thermoplastic polymer to the binder is 70:30 to 80:20.

In the above technical solution, proper setting of the mass ratio of the thermoplastic polymer to the binder in the second insulating layer is conducive to reducing a risk of the detachment of the second insulating layer, and is also conducive to forming a uniform and dense first insulating layer on the end face of the exposed current collector and the burrs.

In a possible implementation, resistance R of the end face provided with the first insulating layer satisfies R≥100Ω. Optionally, the resistance R of the end face provided with the first insulating layer satisfies R≥2000Ω. The resistance at the end face satisfies the above condition, so that a risk of a short circuit in a battery cell that is caused by lapping between the end face and the electrode having the opposite polarity can be reduced.

In a possible implementation, the second insulating layer comprises a first part and a second part, the first part is disposed on the surface of the transition region, and the second part extends from the first part in the first direction and is disposed on a partial surface of the tab. In this manner, a risk of lapping between the tab and the electrode having the opposite polarity can be reduced.

In a possible implementation, in a second direction, end faces of both ends of a region of the tab in which the second part is disposed are disposed with the first insulating layer, and the second direction is different from the first direction. Optionally, the second direction is perpendicular to the first direction. In this manner, the first insulating layer can cover the end face of the tab exposed due to cutting, and a risk caused by lapping between the end face and the electrode having the opposite polarity can be reduced.

In a possible implementation, a material of the first insulating layer is the same as the material of the thermoplastic polymer in the second insulating layer. This is conducive to simplifying preparation steps of the electrode sheet and accelerating the production pace.

In a possible implementation, the thermoplastic polymer in the first insulating layer is in a film-like form, and the thermoplastic polymer in the second insulating layer comprises both the film-like thermoplastic polymer and a particulate thermoplastic polymer. In this manner, the first insulating layer is formed after the thermoplastic polymer in the second insulating layer is melted and then solidified. This is conducive to simplifying preparation steps of the electrode sheet, and the first insulating layer can be formed during cutting.

In a possible implementation, the current collector comprises a metal foil sheet or a composite current collector. Optionally, the metal foil sheet comprises aluminum foil or copper foil. Optionally, the composite current collector comprises a polymer material base layer and a metal layer disposed on at least one surface of the polymer material base layer. Optionally, the current collector comprises aluminum foil. This is conducive to selecting an appropriate current collector according to actual needs. In a case that the current collector comprises aluminum foil, the electrode sheet is a positive electrode sheet, which is conducive to reducing a risk of lapping between the positive electrode sheet and a negative electrode sheet, and is conducive to improving the reliability of the battery cell. In addition, it is also conducive to reducing a risk caused by lapping between the positive electrode sheet and lithium dendrites deposited on the negative electrode sheet.

In a possible implementation, the first insulating layer is further disposed on an end face of the main body portion at a second end, and the second end is opposite to the first end in the first direction. In this manner, the end face of the main body portion at the first end and the end face of the main body portion at the second end are each provided with the first insulating layer, which is conducive to further reducing a risk of a short circuit in the battery cell.

According to a second aspect, a method for preparing an electrode sheet is provided, comprising: providing a current collector; coating an active material in a first region of the current collector to form an active material layer; coating insulating slurry in a second region of the current collector to form a second insulating layer, wherein the insulating slurry comprises a thermoplastic polymer and a binder, volumetric particle size distribution $D_v50$ of the thermoplastic polymer is 6 μm to 10 μm, and a maximum particle size $D_{max}$ of the thermoplastic polymer is 90 μm to 110 μm; and cutting, along a cutting line, the current collector provided with the second insulating layer, wherein at least part of the cutting line is disposed in the second region.

In the above technical solution, through disposing of the second insulating layer, the first insulating layer can be formed during cutting, which is conducive to simplifying preparation steps of the first insulating layer.

In a possible implementation, the volumetric particle size distribution $D_v50$ of the thermoplastic polymer is 7 μm to 8 μm, and the maximum particle size $D_{max}$ of the thermoplastic polymer is 90 μm to 100 μm.

In a possible implementation, the thickness d2 of the second insulating layer is 22 μm to 48 μm. Optionally, the thickness d2 of the second insulating layer is 22 μm to 30 μm.

In a possible implementation, a drop melting point of the thermoplastic polymer is 80° C. to 250° C. Optionally, the drop melting point of the thermoplastic polymer is 80° C. to 150° C.

In a possible implementation, a material of the thermoplastic polymer comprises at least one of a crystalline thermoplastic polymer or an amorphous thermoplastic polymer. Optionally, the crystalline thermoplastic polymer comprises at least one of polyethylene, polypropylene, or polyamide. Optionally, the amorphous thermoplastic polymer comprises at least one of microcrystalline wax, polystyrene, or polymethyl methacrylate.

In a possible implementation, in the insulating slurry, the mass ratio A:B of the thermoplastic polymer to the binder is 60:40 to 80:20. Optionally, in the second insulating layer, the mass ratio A:B of the thermoplastic polymer to the binder is 70:30 to 80:20.

In a possible implementation, the cutting, along a cutting line, the current collector provided with the second insulating layer comprises: controlling a laser processing tool to cut, along the cutting line, the current collector provided with the second insulating layer.

In the above technical solution, the current collector is cut by lasers, and a large amount of heat can be generated in a cutting process, so that the thermoplastic polymer in the second insulating layer can change into a flowing state and flow dynamically to an end face, thereby facilitating the formation of the first insulating layer.

According to a third aspect, a battery cell is provided, comprising the electrode sheet according to the first aspect and any one of the possible implementations thereof, and/or an electrode sheet prepared by the method according to the second aspect and any one of the possible implementations thereof.

According to a fourth aspect, a battery is provided, comprising the battery cell according to the third aspect.

According to a fifth aspect, an electric device is provided, comprising the battery according to the fourth aspect.

DESCRIPTION OF DRAWINGS

In order to more clearly illustrate the technical solutions of the embodiments of the present application, the drawings required to be used in the embodiments of the present application will be briefly introduced below. Obviously, the drawings described below are only some embodiments of the present application. For persons of ordinary skill in the art, other drawings can also be obtained from the drawings without creative work.

REFERENCE SIGNS

Figure 1:
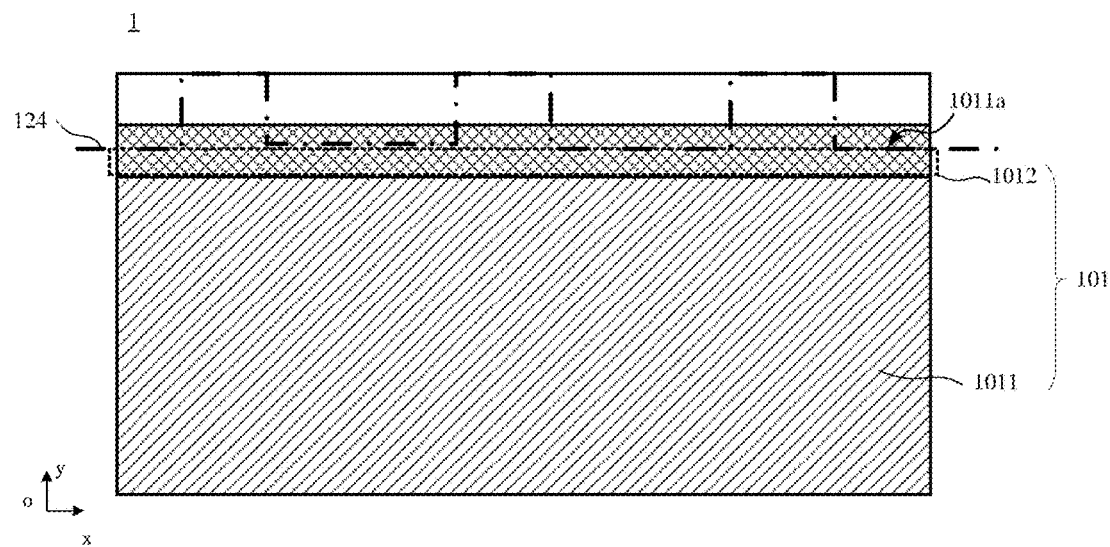
FIG. 1 is a schematic diagram of a structure of an electrode sheet before a tab is processed according to an embodiment of the present application.

1. Electrode sheet; 124. Cutting line; 10. Current collector; 11. Active material layer; 121. First insulating layer; 122. Second insulating layer; 101. Main body portion; 102. Tab; 1011. Coated region; 1012. Transition region; 1011a. End face; 1221. First part; 1222. Second part.

DESCRIPTION OF EMBODIMENTS

Implementations of an electrode sheet, a preparation method therefor, a battery cell, a battery, and an electric device of the present application are described below in detail with reference to the drawings as appropriate. However, an unnecessary detailed description may be omitted. For example, a detailed description of well-known matters and repeated descriptions of a substantially same structure may be omitted. This is to avoid the following descriptions from becoming unnecessarily redundant and to facilitate understanding by those skilled in the art. The accompanying drawings and the following descriptions are provided for those skilled in the art to fully understand this application, and are not intended to limit subject matters described in the claims.

The "range" disclosed in this application is limited in the form of a lower limit and an upper limit. A given range is limited by selecting a lower limit and an upper limit, which define the boundaries of the specific range. A range defined in this manner may include an end value or may not include an end value, and may be any combination, that is, any lower limit may be combined with any upper limit to form a range. For example, if the ranges of 60-120 and 80-110 are listed for a specific parameter, it is understood that the ranges of 60-110 and 80-120 are also expected. In addition, if the minimum range values of 1 and 2 are listed, and if the maximum range values of 3, 4, and 5 are listed, the following ranges may all be expected: 1-3, 1-4, 1-5, 2-3, 2-4, and 2-5. In this application, unless otherwise stated, a numerical range "a-b" represents a shorthand representation for a combination of any real numbers between a and b, where both a and b are real numbers. For example, the numerical range of "0-5" represents that all real numbers between "0-5" have been listed herein, and "0-5" is only a shortened representation of these numerical combinations. In addition, when a parameter is expressed as an integer ≥2, it is equivalent to disclosing that the parameter is an integer such as 2, 3, 4, 5, 6, 7, 8, 9, 10, 11, or 12.

Unless otherwise specified, all embodiments and optional embodiments of this application may be combined with each other to form new technical solutions.

Unless otherwise specified, all technical features and optional technical features of this application can be combined with each other to form new technical solutions.

Unless otherwise specified, all steps in this application may be performed sequentially or randomly, preferably sequentially. For example, the method comprises steps (a) and (b), meaning that the method may comprise steps (a) and (b) performed sequentially or steps (b) and (a) performed sequentially. For example, the mentioned method may further comprise step (c), meaning that step (c) may be added to the method in any order, e.g. the method may comprise steps (a), (b) and (c), or steps (a), (c) and (b), or steps (c), (a) and (b), etc.

Unless specifically stated otherwise, the terms "including" and "containing" as used herein are meant to be open. For example, "including" and "containing" may mean that other components not listed may be further included or contained.

In the present application, the term "and/or" is inclusive, unless specifically stated otherwise. For example, the phrase "A and/or B" means "A, B, or both A and B". More specifically, the condition "A and/or B" is satisfied by either A being true (or present) and B being false (or absent), A being false (or absent) and B being true (or present), or both A and B being true (or present).

In the development of battery technologies, various design factors, for example, energy density, cycle life, discharge capacity, a charge/discharge rate, and reliability, are simultaneously taken into consideration. The design of an electrode sheet in a battery cell is crucial for the reliability of the battery cell. The electrode sheet generally includes a current collector and an active material layer and an insulating layer that are coated in different regions of the current collector, and after the corresponding active material layer and insulating layer are coated on the current collector, it is required to cut the current collector coated with the active material layer and the insulating layer to form a tab. In a cutting process, dust and burrs are easily generated, and the burrs may cause lapping between the electrode sheet and an electrode having an opposite polarity, which causes a short circuit.

In some processing methods, the insulating layer coated on the current collector is disposed as a ceramic coating to reduce burrs that occur in the cutting process. However, this processing method can only reduce the number of burrs, but burrs still exist after cutting, and the burrs may cause lapping between the electrode sheet and the electrode having the opposite polarity, which causes an adverse effect. In addition, an end face of the current collector is exposed after cutting, and the exposed end face has a risk of lapping with the electrode having the opposite polarity, which may cause a short circuit in a battery cell and is not conducive to improving the reliability of the battery.

In order to further improve the reliability of the battery cell, a specific region of the current collector is coated with an insulating layer, and the insulating layer includes a thermoplastic polymer. The cutting line is located in a region in which the insulating layer is located, and in a process of cutting the current collector to prepare the tab, the thermoplastic polymer in the insulating layer changes from a solid state to a flowing state after being heated, flows to an end face of the current collector that has been cut, and solidifies at the end face after being cooled, to form a new insulating layer. The new insulating layer formed at the end face may cover burrs generated by cutting and the end face exposed after cutting. However, the uniformity and density of the formed new insulating layer are relatively poor, resulting in a lower degree of improvement to the reliability of the battery cell.

In view of this, the present application provides an electrode sheet. In this electrode sheet, a specific region of the current collector is coated with an insulating layer, volumetric particle size distribution $D_v50$ of the thermoplastic polymer in the insulating layer is 6 μm to 10 μm, and a maximum particle size $D_{max}$ of the thermoplastic polymer is 90 μm to 110 μm. In this manner, the thermoplastic polymer has an appropriate particle size, so that agglomeration of the thermoplastic polymer can be reduced in a process of coating the insulating layer; and in a process of cutting the tab, the thermoplastic polymer has an appropriate flowing path after changing from a solid state to a flowing state, which facilitates the formation of a uniform and dense insulating covering layer at the end face, thereby improving the reliability of the battery cell.

[Electrode Sheet]

Figure 2:
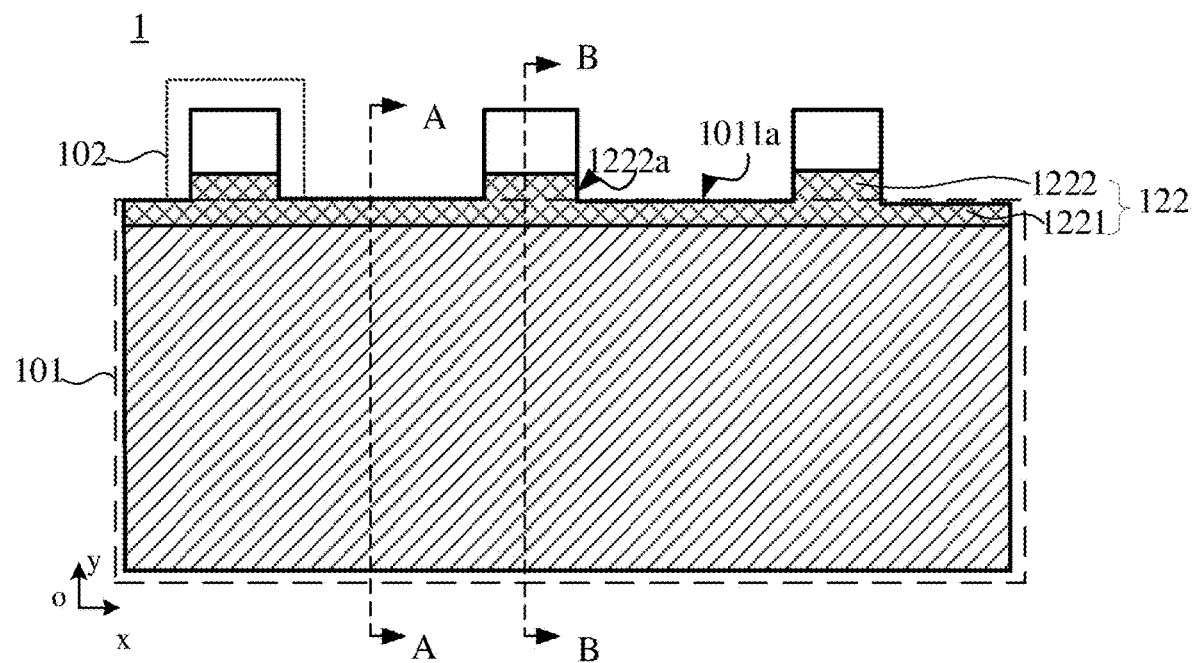
FIG. 2 is a schematic diagram of an electrode sheet according to an embodiment of the present application.
Figure 3:
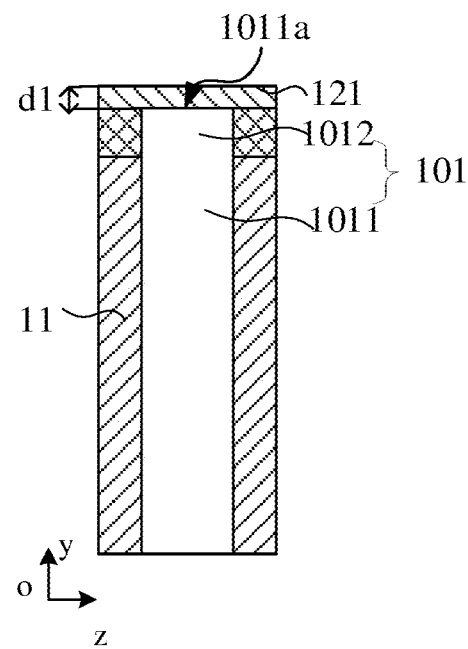
FIG. 3 is a sectional view in a direction A-A in FIG. 2.
Figure 4:
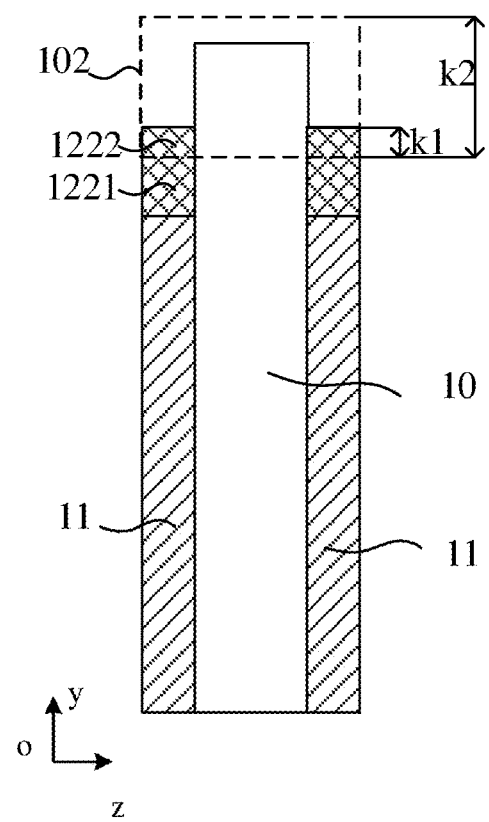
FIG. 4 is a sectional view in a direction B-B in FIG. 2.

FIG. 1 is a schematic diagram of an electrode sheet before a tab is processed according to an embodiment of the present application. FIG. 2 is a schematic diagram of an electrode sheet according to an embodiment of the present application. FIG. 3 is a sectional view in a direction A-A in FIG. 2. FIG. 4 is a sectional view in a direction B-B in FIG. 2.

With reference to FIG. 1 and FIG. 2, FIG. 1 is a schematic diagram of an electrode sheet before a tab is processed, and FIG. 2 is a schematic diagram of an electrode sheet after a tab is processed. As shown in FIG. 1, a black dashed line 124 shows a cutting line for cutting a tab, and after cutting is performed along the cutting line 124, an electrode sheet 1 shown in FIG. 2 is obtained.

With reference to FIG. 1 to FIG. 4, the electrode sheet 1 includes a current collector 10, an active material layer 11, a first insulating layer 121, and a second insulating layer 122.

The current collector 10 has two surfaces that are opposite to each other in a thickness direction of the current collector, and the active material layer 11 may be disposed on at least one of the two surfaces that are opposite to each other in the thickness direction of the current collector 10. For example, as shown in FIG. 3 and FIG. 4, the two surfaces that are opposite to each other in the thickness direction of the current collector 10 are each provided with the active material layer 11.

The thickness direction of the current collector 10 may be a z-direction shown in FIG. 3 and FIG. 4.

The current collector 10 includes a main body portion 101 and a tab 102, where the tab 102 extends from a first end of the main body portion 101, and the first end of the main body portion 101 is an end of the main body portion 101 in a first direction.

The first direction is parallel to a plane in which the current collector 10 is located, and the first direction is a direction in which the tab 102 protrudes with respect to the main body portion 101. For example, the first direction is a y-direction in FIG. 2.

The main body portion 101 includes a coated region 1011 and a transition region 1012, and the transition region 1012 is disposed between the coated region 1011 and the tab 102.

The active material layer 11 is disposed on a surface of the coated region 1011. For example, as shown in FIG. 3 and FIG. 4, the active material layer 11 is disposed on two surfaces of the current collector 10 in the thickness direction. In some embodiments, the active material layer 11 may be disposed on one of the two surfaces of the current collector 10 in the thickness direction.

The first insulating layer 121 is disposed on an end face 1011a of the main body portion 101 at the first end.

The end face 1011a of the main body portion 101 at the first end is a surface parallel to the thickness direction of the current collector 10. For example, as shown in FIG. 3, the end face 1011a is a surface parallel to the x-direction and the z-direction.

The end face 1011a of the main body portion 101 at the first end may be formed through the following process: as shown in FIG. 1, cutting the current collector 10 along the cutting line 124 in a process of cutting the current collector 10, where the end face 1011a is an end face of the transition region 1012 obtained after cutting. After cutting, the current collector 10 at the end face 1011a is exposed and may be accompanied by the generation of burrs.

The first insulating layer 121 is disposed at the end face 1011a, so that the first insulating layer 121 can cover burrs generated in the cutting process, thereby reducing a risk of lapping between the burrs and an electrode having an opposite polarity. For example, after the electrode sheet 1 and an electrode sheet having an opposite polarity (for example, the electrode sheet 1 is a positive electrode sheet, and the electrode sheet having the opposite polarity is a negative electrode sheet) are assembled into an electrode assembly through winding or lamination, and the electrode assembly is assembled with an end cap assembly and a housing to form a battery cell, the burrs may overlap the electrode sheet having the opposite polarity. Through disposing of the first insulating layer 121, the first insulating layer 121 can cover the burrs, so that a risk caused by lapping between the burrs and the electrode having the opposite polarity can be reduced.

The first insulating layer 121 is disposed at the end face 1011a, so that the first insulating layer 121 can cover the end face 1011a exposed after the current collector 10 is cut, thereby reducing a risk of lapping between the end face 1011a and an electrode having an opposite polarity. For example, if the electrode sheet 1 is a positive electrode sheet, the first insulating layer 121 can be disposed to reduce a risk of an internal short circuit in the battery cell that is caused by lapping between the electrode sheet 1 and a negative electrode sheet.

At least part of the second insulating layer 122 is disposed on a surface of the transition region 1012. In other words, the second insulating layer 122 is disposed on the surface of the transition region 1012, and the second insulating layer 122 may also be disposed in other regions of the current collector 10 other than the transition region 1012. Disposing of the second insulating layer 122 in the transition region 1012 is conducive to reducing a risk of lapping between the electrode sheet 1 and an electrode sheet 1 having an opposite polarity.

The second insulating layer 122 includes a thermoplastic polymer, volumetric particle size distribution $D_v50$ of the thermoplastic polymer is 6 μm to 10 μm, and a maximum particle size $D_{max}$ of the thermoplastic polymer is 90 μm to 110 μm. For example, a median particle size $D_v50$ of the thermoplastic polymer is 6 μm, and the maximum particle size $D_{max}$ is 90 μm. For another example, $D_v50$ is 8 μm, and $D_{max}$ is 100 μm. For still another example, $D_v50$ is 10 μm, and $D_{max}$ is 110 μm. The embodiments of the present application include, but are not limited thereto, provided that $D_v50$ and $D_{max}$ satisfy the above conditions.

Optionally, the volumetric particle size distribution $D_v50$ of the thermoplastic polymer corresponds to the maximum particle size $D_{max}$. For example, due to limitations such as a preparation process of the thermoplastic polymer, in a case that the volumetric particle size distribution $D_v50$ of the thermoplastic polymer is 6 μm, the maximum particle size $D_{max}$ of the thermoplastic polymer is 90 μm.

The thermoplastic polymer may be a polymer that softens after being heated, solidifies after being cooled, and can be softened again. For example, when heated to specific temperature, the thermoplastic polymer changes from a solid particle to a flowable state, and when cooled, the thermoplastic polymer may change into a layered or film-like thermoplastic polymer.

The thermoplastic polymer in the second insulating layer 122 changes from a solid state to a flowing state when heated to a specific condition. In this manner, in a process of cutting the current collector 10 disposed with the second insulating layer 122, the thermoplastic polymer in the flowing state can flow to burrs and the exposed end face 1011a, and after temperature is reduced, the thermoplastic polymer in the flowing state solidifies at the burrs and the exposed end face 1011a to cover the burrs and the exposed end face 1011a, so that a risk of lapping between both the burrs and the exposed end face 1011a and the electrode having the opposite polarity can be reduced.

The volumetric particle size distribution $D_v50$ may refer to a particle size corresponding to a case that a cumulative volumetric distribution percentage of a sample reaches 50%.

In a case that a particle size of the thermoplastic polymer is excessively small, when the thermoplastic polymer is prepared as slurry to be coated on the current collector 10, the thermoplastic polymer is unevenly distributed, and the thermoplastic polymer is easily agglomerated. After the slurry is formed into the second insulating layer 122, the agglomerated thermoplastic polymer has a long flowing path in a flowing state in a die-cutting process, which is not conducive to forming a uniform and dense first insulating layer 121 at the end face 1011a.

In a case that the particle size of the thermoplastic polymer is excessively large, the thermoplastic polymer having a large particle size has a long flowing path after changing from a solid state to a flowing state, which is not conducive to forming a uniform and dense first insulating layer 121 at the end face 1011a.

Properly setting of the particle size of the thermoplastic polymer is conducive to reducing the agglomeration of the thermoplastic polymer in a preparation process, and is conducive to forming a uniform and dense first insulating layer 121 at the end face 1011a.

An embodiment of the present application provides an electrode sheet 1. The electrode sheet 1 includes a current collector 10, an active material layer 11, a first insulating layer 121, and a second insulating layer 122. The current collector 10 includes a main body portion 101 and a tab 102. The tab 102 extends from a first end of the main body portion 101, and the first end of the main body portion 101 is an end of the main body portion 101 in a first direction. The main body portion 101 includes a coated region 1011 and a transition region 1012, the transition region 1012 is disposed between the coated region 1011 and the tab 102, and the coated region 1011 is provided with the active material layer 11. In this manner, through disposing of the transition region 1012, in a process of cutting the tab 102, a cutting tool can maintain a specific distance from the active material layer 11, thereby reducing the detachment of the active material layer 11. The first insulating layer 121 is disposed on the end face 1011a of the main body portion 101 at the first end, so that the first insulating layer 121 can cover the end face 1011a of the first end to reduce a risk of exposing the current collector at the end face 1011a, thereby reducing a risk of lapping between the current collector 10 exposed at the end face 1011a and an electrode having an opposite polarity. Further, the first insulating layer 121 can cover burrs generated in the cutting process, thereby reducing a risk of lapping between the burrs and the electrode having the opposite polarity. At least part of the second insulating layer 122 is disposed on a surface of the transition region 1012, and the second insulating layer 122 includes a thermoplastic polymer. In this manner, a cutting line is located in the transition region 1012, and in the process of cutting the tab 102, the thermoplastic polymer in the second insulating layer 122 on the surface of the transition region 1012 changes from a solid state to a flowing state after being heated. The thermoplastic polymer in the flowing state flows to the end face 1011a of the first end, and solidifies at the end face 1011a after being cooled. The volumetric particle size distribution $D_v50$ of the thermoplastic polymer is 6 µm to 10 µm, and the maximum particle size $D_{max}$ of the thermoplastic polymer is 90 µm to 110 µm. Through proper setting of the particle size of the thermoplastic polymer, the thermoplastic polymer is less likely to agglomerate, and the thermoplastic polymer has an appropriate flowing path after being heated. This facilitates the formation of a uniform and dense first insulating layer 121 at the end face 1011a, thereby enabling uniform and dense covering of the end face. Thus, the technical solution according to the embodiments of the present application can improve the uniformity and density of the first insulating layer 121, which is conducive to further improving the reliability of the battery cell.

In some embodiments, the volumetric particle size distribution $D_v50$ of the thermoplastic polymer is 7 µm to 8 µm, and the maximum particle size $D_{max}$ of the thermoplastic polymer is 90 µm to 100 µm. In this manner, the thermoplastic polymer is less likely to agglomerate and has a relatively appropriate flowing path after changing from a solid state to a flowing state after being heated, thereby facilitating the formation of a uniform and dense first insulating layer 121 at the end face.

In some embodiments, the thickness d2 of the second insulating layer 122 is 22 µm to 48 µm. For example, d2 is 22 µm, 25 µm, 30 µm, 40 µm, 45 µm, 48 µm, or any number within the above range.

The thickness d2 of the second insulating layer 122 refers to the thickness of a surface on one side of the current collector 10. In the electrode sheet 1, the total thickness of the second insulating layer 122 is 44 µm to 96 µm in a thickness direction of the electrode sheet 1.

The thickness d2 of the second insulating layer 122 is the average thickness of the second insulating layer 122 in a thickness direction of the current collector 10. For example, the thickness d2 is an average value of a maximum dimension and a minimum dimension in the first direction.

In a case that the thickness d2 of the second insulating layer 122 is not less than 22 µm, there are a large quantity of thermoplastic polymers in the second insulating layer 122 in a process of cutting the current collector 10 provided with the second insulating layer 122, so that the large quantity of thermoplastic polymers can flow to burrs and an exposed end face 1011a of the current collector 10 after being heated, which is conducive to covering the exposed end face 1011a and the burrs uniformly and densely.

In a case that the thickness d2 of the second insulating layer 122 does not exceed 48 µm, it is conducive to reducing energy consumed in the cutting process.

Optionally, when the thickness d2 of the second insulating layer 122 is 20 µm to 30 µm, an effect of covering the exposed end face 1011a and the burrs can be improved while reducing the energy consumed for cutting.

The thickness d2 of the second insulating layer 122 may be measured in the following manner: photographing the electrode sheet 1 with an electron scanning (SEM) microscope in the thickness direction of the electrode sheet 1, and measuring the thickness d2 of the second insulating layer 122 through an obtained picture.

Optionally, the thickness of the second insulating layer 122 is 20 µm to 50 µm, for example, 20 µm, 50 µm, or any value within the above range.

In some embodiments, the thickness d1 of the first insulating layer 121 is 300 nm to 1800 nm. For example, d1 may be 300 nm, 400 nm, 500 nm, 800 nm, 1000 nm, 1500 nm, 1800 nm, or any number within the above range.

A smaller thickness d1 of the first insulating layer 121 leads to smaller space occupied by the electrode sheet 1, which is conducive to improving volumetric energy density of the battery cell. The thickness d1 of the first insulating layer 121 is set to 300 nm to 1800 nm, so that the first insulating layer 121 can better cover the burrs and the exposed end face 1011a with a small thickness, which is conducive to further improving the performance of the battery cell.

The thickness d1 of the first insulating layer 121 is an average thickness of the first insulating layer 121 in the first direction. For example, the thickness d1 is an average value of a maximum dimension and a minimum dimension in the first direction.

The thickness d1 of the first insulating layer 121 may be measured in the following manner: photographing the end face 1011a of the electrode sheet 1 with an electron scanning (SEM) microscope, and measuring the thickness d1 of the first insulating layer 121 through an obtained picture.

Optionally, the thickness d1 of the first insulating layer 121 is 300 nm to 860 nm. This is conducive to further reducing the thickness of the first insulating layer 121 while better covering the burrs and the exposed end face 1011a.

Optionally, the thickness d1 of the first insulating layer 121 is 200 nm to 2000 nm. For example, d1 may be 200 nm, 2000 nm, or any number within the above range.

In some embodiments, a drop melting point of the thermoplastic polymer is 80° C. to 250° C. For example, the drop melting point of the thermoplastic polymer is 80° C., 100° C., 150° C., 200° C., 250° C., or any number within the above range.

The drop melting point of the thermoplastic polymer is not lower than 80° C., so that a risk of melting or flowing of the thermoplastic polymer due to heating of the electrode sheet 1 in another processing process can be reduced. The drop melting point of the thermoplastic polymer does not exceed 250° C., so that a risk that the thermoplastic polymer cannot change into a flowing state in a cutting process can be reduced, thereby reducing a risk that the first insulating layer 121 cannot be formed at the end face 1011a.

The drop melting point of the thermoplastic polymer is temperature at which the thermoplastic polymer changes from a solid or semi-solid state to a liquid state.

In a process of cutting the current collector 10 provided with the second insulating layer 122, heat generated by cutting causes the thermoplastic polymer to change from a solid state to a flowing state, and the thermoplastic polymer in the flowing state can flow to the end face 1011*a* of the current collector 10 exposed after being cut and burrs generated by cutting, thereby facilitating the preparation of the first insulating layer 121.

Optionally, the drop melting point of the thermoplastic polymer is 80° C. to 150° C., which is conducive to reducing energy consumed in the cutting process.

Optionally, the drop melting point of the thermoplastic polymer is 150° C. to 250° C., so that a risk that the thermoplastic polymer changes into a flowing due to other factors in a process of not cutting the current collector 10 can be reduced.

In some embodiments, a material of the thermoplastic polymer includes at least one of a crystalline thermoplastic polymer or an amorphous thermoplastic polymer. Optionally, the crystalline thermoplastic polymer includes at least one of polyethylene, polypropylene, or polyamide. Optionally, the amorphous thermoplastic polymer includes at least one of microcrystalline wax, polystyrene, or polymethyl methacrylate.

A drop melting point of the crystalline thermoplastic polymer may refer to a melting point of the crystalline thermoplastic polymer. A drop melting point of the amorphous thermoplastic polymer may refer to glass transition temperature of the amorphous thermoplastic polymer.

In the above technical solution, the use of the thermoplastic polymer facilitates the formation of uniform and dense covering on the end face 1011*a* of the current collector 10 exposed after being cut and the burrs. Further, the thermoplastic polymer features high insulation properties and pressure resistance, and when the electrode sheet 1 is immersed in an electrolyte solution, the thermoplastic polymer does not electrochemically react with the electrolyte solution.

In some embodiments, a material of the second insulating layer 122 further includes a binder.

The provision of the binder in the second insulating layer 122 facilitates the bonding of the thermoplastic polymer to the transition region 1012, so that a risk that the second insulating layer 122 is detached from the transition region 1012 can be reduced.

In some embodiments, in the second insulating layer 122, the mass ratio A:B of the thermoplastic polymer to the binder is 60:40 to 80:20. For example, A:B is 60:40, 70:30, 75:25, 80:20, or any number within the above range.

In the above technical solution, proper setting of the mass ratio of the thermoplastic polymer to the binder in the second insulating layer 122 is conducive to reducing a risk of detachment of the second insulating layer 122, and is also conducive to forming a uniform and dense first insulating layer 121 at the end face 1011*a* of the exposed current collector 10 and the burrs.

Optionally, in the second insulating layer 122, the mass ratio A:B of the thermoplastic polymer to the binder is 70:30 to 80:20.

In some embodiments, resistance R of the end face 1011*a* provided with the first insulating layer 121 satisfies R≥100Ω. For example, R is 100 Ω, 500Ω, or 1000 Ω.

In a case that the resistance of the end face 1011*a* is greater than 100Ω, even if the end face 1011*a* laps an electrode having an opposite polarity in some extreme cases, since the end face 1011*a* has a specific level of resistance, an internal short circuit does not occur in the battery cell, so that risks such as fire or even explosion caused by the internal short circuit can be reduced.

Optionally, resistance R of the end face 1011*a* provided with the first insulating layer 121 satisfies R≥2000Ω. For example, R is 200 Ω, 5000Ω, or infinity. In this manner, a risk of an internal short circuit in the battery cell can be further reduced.

In some embodiments, the second insulating layer 122 includes a first part 1221 and a second part 1222, the first part 1221 is disposed on the surface of the transition region 1012 and the second part 1222 extends from the first part 1221 in the first direction and is disposed on a partial surface of the tab 102. In this manner, a risk of lapping between the tab 102 and the electrode having the opposite polarity can be reduced.

The second part 1222 of the second insulating layer 122 is disposed in a partial region of the tab 102, and the second part 1222 is not disposed in other regions. In this manner, welding through the tab 102 and subsequent use of the battery cell are facilitated.

In some embodiments, in a second direction, end faces 1222*a* of both ends of a region of the tab 102 in which the second part 1222 is disposed are disposed with the first insulating layer 121, and the second direction is different from the first direction.

In a case that the electrode sheet 1 includes a plurality of tabs 102, the second direction may be an arrangement direction of the plurality of tabs 102. For example, as shown in FIG. 2, the second direction is the x-direction.

In a process of cutting the current collector 10 along the cutting line 124 to prepare the tab 102, a cutting tool passes through a region of the second part 1222, and after cutting, the end face 1222*a* of the region in the second direction is exposed. The first insulating layer 121 is disposed at the end face 1222*a*, so that a risk of lapping between the end face 1222*a* and the electrode having the opposite polarity can be reduced.

The first insulating layer 121 disposed on the end faces 1222*a* at both ends of the region of the second part 1222 is formed in the process of cutting the current collector 10.

Optionally, the second direction is perpendicular to the first direction. This facilitates cutting of the tab 102.

In some embodiments, a material of first insulating layer 121 is the same as the material of the thermoplastic polymer in the second insulating layer 122. This is conducive to simplifying preparation steps of the electrode sheet 1.

For example, the active material layer 11 and the second insulating layer 122 are first prepared on the current collector 10, and the first insulating layer 121 is prepared at the same time in the cutting process. In this manner, it is possible to produce the tab 102 by cutting in one step and simultaneously prepare the first insulating layer 121.

In some embodiments, the thermoplastic polymer in the first insulating layer 121 is in a film-like form, and the thermoplastic polymer in the second insulating layer 122 includes both the film-like thermoplastic polymer and a particulate thermoplastic polymer. In this manner, the first insulating layer 121 is formed after the thermoplastic polymer in the second insulating layer 122 is melted and then solidified. In this manner, the thermoplastic polymer in the second insulating layer 122 changes into a flowing state, and then flows to the end face 1011*a* and solidifies at the end face 1011*a*, to form the first insulating layer 121. This is conducive to simplifying preparation steps of the electrode sheet 1, and the first insulating layer 121 can be formed while the tab 102 is prepared.

In the second insulating layer 122, at least part of the particulate thermoplastic polymer is retained, and in the first insulating layer 121, the thermoplastic polymer is film-like and has almost no particle shape.

The particulate thermoplastic polymer may have a variety of shapes, for example, spherical, rod-like, or lamellar. Here, the particulate thermoplastic polymer means that the thermoplastic polymer does not change into the flowing state, and the thermoplastic polymer is in a solid state.

Before the second insulating layer 122 is cut, the thermoplastic polymer in the second insulating layer 122 is particulate. In a process of cutting the second insulating layer 122, a part of the thermoplastic polymer in the second insulating layer 122 changes from a solid state to a flowing state (for example, a part of the thermoplastic polymer near the cutting line 124 changes into a flowing state), and another part of the thermoplastic polymer remains as solid particles.

In some embodiments, the current collector 10 includes a metal foil sheet or a composite current collector. In this manner, it is convenient to set a material of the current collector 10 according to actual needs.

Optionally, the metal foil sheet includes aluminum foil or copper foil.

Optionally, the composite current collector includes a polymer material base layer and a metal layer formed on at least one surface of the polymer material base layer.

Optionally, the current collector includes aluminum foil. In this manner, the electrode sheet 1 is a positive electrode sheet, which is conducive to reducing a risk of lapping between the positive electrode sheet and a negative electrode sheet, and is conducive to improving the reliability of the battery cell. In addition, it is also conducive to reducing a risk caused by lapping between the positive electrode sheet and lithium dendrites deposited on the negative electrode sheet.

In some embodiments, the first insulating layer 121 is further disposed on an end face of the main body portion 101 at a second end, and the second end is opposite to the first end in the first direction.

The main body portion 101 has two opposite ends in the first direction, and the two ends are a first end and a second end, respectively. The tab 102 protrudes from the main body portion 101 at a first end, and a second end is opposite to the first end in the first direction.

An end face of the main body portion 101 at the second end and an end face of the main body portion 101 at the first end are each provided with the first insulating layer 121, so that it is conducive to reducing a risk of an internal short circuit in the battery cell that is caused by lapping between both the end face at the first end and the end face at the second end and the electrode having the opposite polarity, and it is conducive to further improving the reliability of the battery cell.

The technical solution of the electrode sheet is described above with reference to FIG. 1 to FIG. 4, and a method for preparing an electrode sheet is described below with reference to FIG. 5. For a part corresponding to the electrode sheet, reference may be made to the descriptions above, and details are not described here again.

[Method for Preparing an Electrode Sheet]

Figure 5:
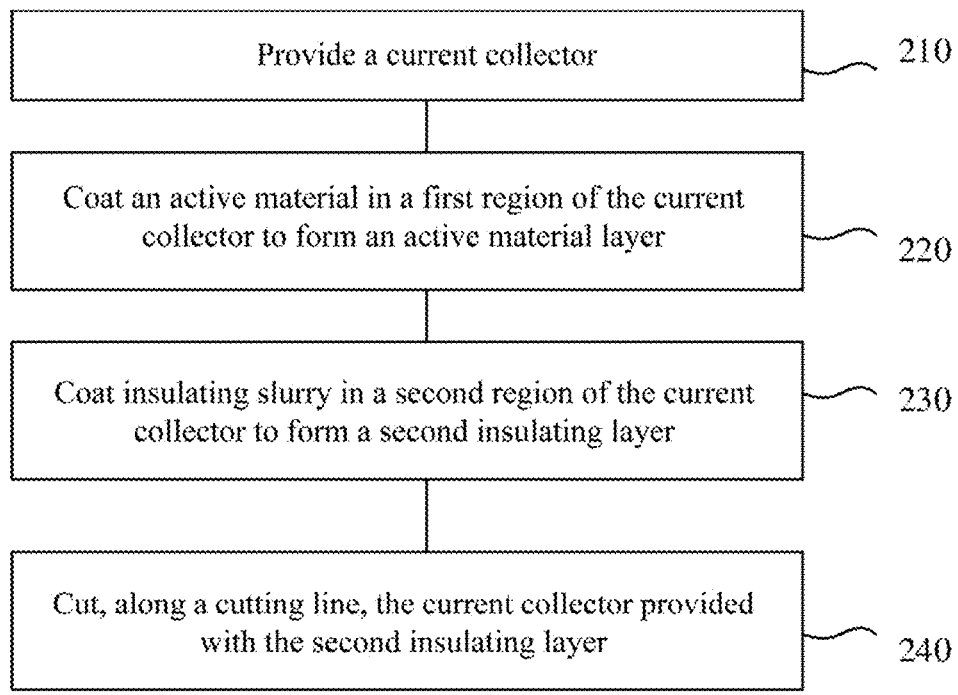
FIG. 5 is a schematic diagram of a method for preparing an electrode sheet according to an embodiment of the present application.

FIG. 5 is a schematic diagram of a method for preparing an electrode sheet according to an embodiment of the present application. The method 200 may be used to prepare the electrode sheet 1 in the embodiment described above. The method 200 includes the following steps.

Step 210: providing a current collector 10.

Figure 6:
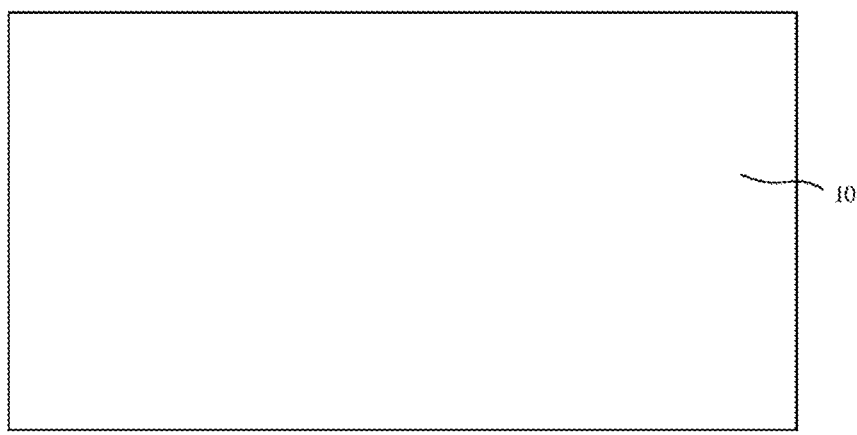
FIG. 6 is a schematic diagram of a current collector according to an embodiment of the present application.

FIG. 6 is a schematic diagram of a current collector according to an embodiment of the present application. For example, as shown in FIG. 6, a shape of the current collector 10 is a sheet or a rectangle. The shape and the size of the current collector 10 may be set according to actual needs. The embodiment of the present application includes but is not limited thereto.

Step 220: coating an active material in a first region of the current collector 10 to form an active material layer 11.

Figure 7:
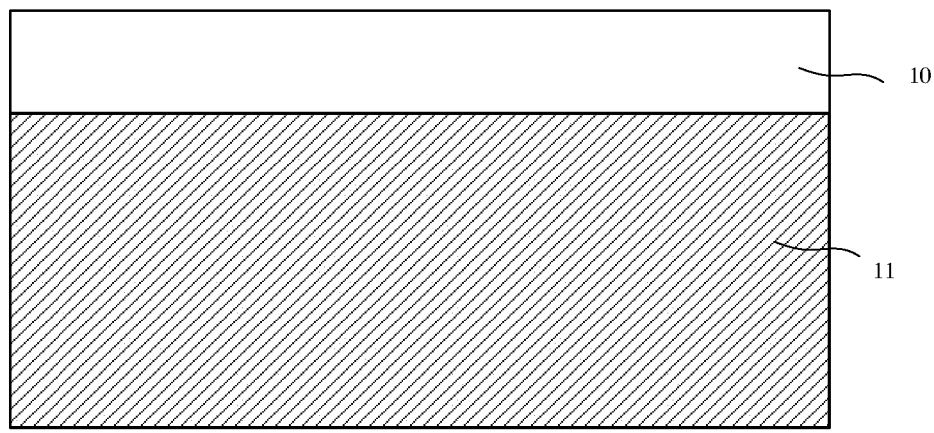
FIG. 7 is a schematic diagram of a current collector coated with an active material layer according to an embodiment of the present application.

FIG. 7 is a schematic diagram of a current collector coated with an active material layer according to an embodiment of the present application. As shown in FIG. 7, the active material is coated in the first region of the current collector 10 to obtain the current collector 10 provided with the active material layer 11.

The first region of the current collector 10 may be a region that is disposed according to actual needs. In the embodiment of the present application, the first region corresponds to a coated region 1011 of a main body portion 101 of the electrode sheet 1.

Step 230: coating insulating slurry in a second region of the current collector 10 to form a second insulating layer 122.

The insulating slurry includes a thermoplastic polymer and a binder, volumetric particle size distribution $D_v50$ of the thermoplastic polymer is 6 μm to 10 μm, and a maximum particle size $D_{max}$ of the thermoplastic polymer is 90 μm to 110 μm.

Figure 8:
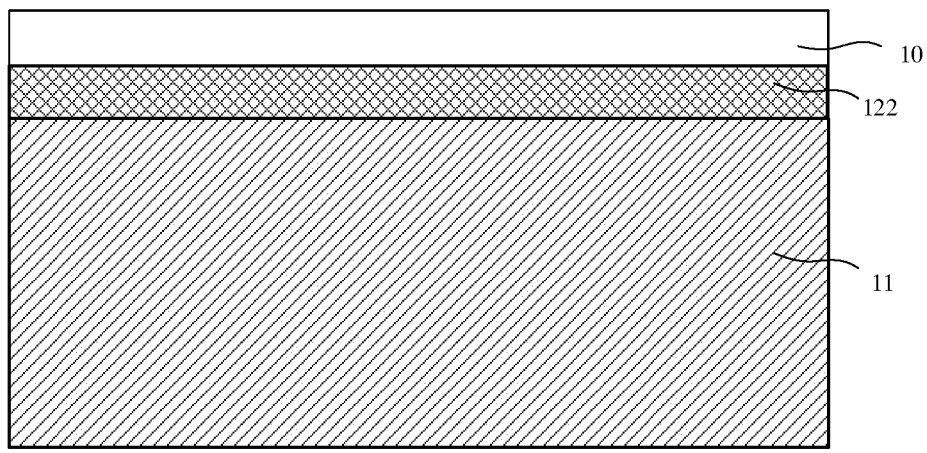
FIG. 8 is a schematic diagram of a current collector coated with a second insulating layer according to an embodiment of the present application.

FIG. 8 is a schematic diagram of a current collector coated with a second insulating layer according to an embodiment of the present application. As shown in FIG. 8, the insulating slurry is coated in the second region of the current collector 10 to obtain a current collector 10 provided with the second insulating layer 122.

The size of the second region may be set according to actual needs. In the embodiment of the present application, the second region corresponds to a transition region 1012 of the main body portion 101 of the electrode sheet 1 and a region of a tab 102 in which the second insulating layer 122 is disposed.

Step 240: cutting, along a cutting line 124, the current collector 10 provided with the second insulating layer 122, where at least part of the cutting line 124 is disposed in the second region.

Figure 9:
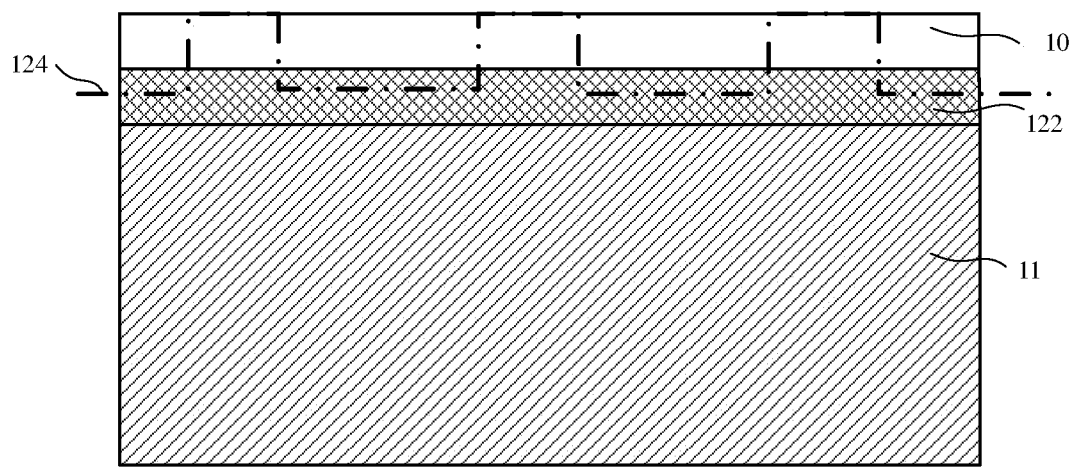
FIG. 9 is a schematic diagram of a current collector for which a cutting line is shown according to an embodiment of the present application.

FIG. 9 is a schematic diagram of a current collector for which a cutting line is shown according to an embodiment of the present application. As shown in FIG. 9, the current collector 10 is cut along the cutting line 124 to obtain the electrode sheet 1 shown in FIG. 2 to FIG. 4.

In the above technical solution, through disposing of the second insulating layer 122, the first insulating layer 121 can be formed during cutting, which is conducive to simplifying preparation steps of the first insulating layer 121. The electrode sheet 1 prepared by the above method is applied to a battery cell, so that the battery cell can have high reliability.

In some embodiments, the volumetric particle size distribution $D_v50$ of the thermoplastic polymer is 7 μm to 8 μm, and the maximum particle size $D_{max}$ of the thermoplastic polymer is 90 μm to 100 μm.

In some embodiments, the thickness d2 of the second insulating layer 122 is 22 μm to 48 μm. Optionally, d2 is 22 μm to 30 μm.

In some embodiments, a drop melting point of the thermoplastic polymer is 80° C. to 250° C. Optionally, the drop melting point of the thermoplastic polymer is 80° C. to 150° C.

In some embodiments, a material of the thermoplastic polymer includes at least one of a crystalline thermoplastic polymer or an amorphous thermoplastic polymer. Optionally, the crystalline thermoplastic polymer includes at least one of polyethylene, polypropylene, or polyamide. Optionally, the amorphous thermoplastic polymer includes at least one of microcrystalline wax, polystyrene, or polymethyl methacrylate.

In some embodiments, in insulating slurry, the mass ratio A:B of a thermoplastic polymer to a binder is 60:40 to 80:20. Optionally, in the second insulating layer 122, the mass ratio A:B of a thermoplastic polymer to a binder is 70:30 to 80:20.

In some embodiments, step 240 includes the step of controlling a laser processing tool to cut, along the cutting line, the current collector 10 provided with the second insulating layer 122. As an example, power of the laser processing tool is 200 W, frequency is 200 kHz, and a feed rate is 30 m/min.

In the embodiment of the present application, parameters used by lasers may be adjusted based on the drop melting point of the thermoplastic polymer, the thickness of the second insulating layer 122, and the like. For example, in a case that the drop melting point of the thermoplastic polymer is high or the second insulating layer 122 is thick, the power or the frequency may be increased, or the feed rate may be decreased. For another example, a cutting parameter suitable for all cases (for example, a thermoplastic polymer suitable for various drop melting points) may be selected to cut the current collector 10.

In the above technical solution, the current collector is cut by lasers, and a large amount of heat can be generated in a cutting process, so that the thermoplastic polymer in the second insulating layer 122 can change into a flowing state and flow dynamically to an end face 1011a, thereby facilitating the formation of the first insulating layer 121.

[Anode Plate]

The electrode sheet 1 in the embodiment of the present application may be a positive electrode sheet. The positive electrode sheet includes a positive electrode current collector and a positive electrode film layer disposed on the positive electrode current collector.

The positive electrode current collector may be a metal foil sheet or may be a composite current collector. For example, the positive electrode current collector may be aluminum foil.

The composite current collector may include a polymer material base layer and a metal layer formed on at least one surface of the polymer material base layer. The composite current collector may be formed by forming a metal material (aluminum, an aluminum alloy, nickel, a nickel alloy, titanium, a titanium alloy, silver, a silver alloy, and the like) on a base material of a polymer material such as a base material of polypropylene (PP), polyethylene terephthalate (PET), polybutylene terephthalate (PBT), polystyrene (PS), polyethylene (PE), and the like.

The positive electrode film layer includes a positive electrode active material. The positive electrode active material may be a positive electrode active material for a battery known in the art. For example, the positive electrode active material is lithium iron phosphate, a ternary material, a lithium-rich manganese-based material, or the like. As an example, the positive electrode active material is a ternary material, and further, is a high-nickel ternary material, for example, $LiNi_{0.6}Co_{0.2}Mn_{0.2}O_2$ or $LiNi_{0.8}Co_{0.1}Mn_{0.1}O_2$.

The positive electrode film layer may optionally include a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

The positive electrode film layer may optionally include a conductive agent. The conductive agent may be selected from at least one of superconducting carbon, acetylene black, carbon black, Ketjen black, carbon dots, carbon nanotubes, graphene, and carbon nanofibers.

[Cathode Plate]

The electrode sheet 1 in the embodiment of the present application may be a negative electrode sheet. The negative electrode sheet includes a negative electrode current collector and a negative electrode film layer disposed on the negative electrode current collector.

The negative electrode current collector may be a metal foil sheet or may be a composite current collector. The negative electrode current collector may be copper foil. The composite current collector may be formed by forming a metal material (copper, a copper alloy, nickel, a nickel alloy, titanium, a titanium alloy, silver, a silver alloy, or the like) on the polymer material substrate (e.g., a substrate of polypropylene (PP), polyethylene terephthalate (PET), polybutylene terephthalate (PBT), polystyrene (PS), or polyethylene (PE)).

The negative electrode film layer includes a negative electrode active material. The negative electrode active material may be a negative electrode active material for a battery known in the art. As an example, the negative electrode active material may include at least one of the following materials: synthetic graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, the present application is not limited to these materials, and another conventional material that can be used as a negative electrode active material of a battery may also be used. These negative electrode active materials may be used alone or in combination of two or more thereof.

The negative electrode film layer may optionally include a conductive agent. The conductive agent may be selected from at least one of superconducting carbon, acetylene black, carbon black, Ketjen black, carbon dots, carbon nanotubes, graphene, and carbon nanofibers.

[Electrolyte]

The electrolyte functions to conduct ions between the positive electrode tab and the negative electrode tab. The type of the electrolyte is not specifically limited in the embodiment of the present application, and may be selected according to a requirement. For example, the electrolyte may be liquid, gelled or all solid.

In some embodiments, the electrolyte is an electrolyte solution. The electrolyte solution includes an electrolyte salt and a solvent.

The electrolyte salt may include at least one of lithium hexafluorophosphate, lithium tetrafluoroborate, lithium perchlorate, lithium hexafluoroarsenate, lithium bisfluorosulfonylimide, lithium bistrifluoromethanesulfonylimide, lithium trifluoromethanesulfonate, lithium difluorophosphate, lithium difluorooxalatoborate, lithium dioxalatoborate, lithium difluorodioxalatophosphate, and lithium tetrafluorooxalatophosphate.

The solvent may include at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

The electrolyte may optionally include a negative electrode film-forming additive, a positive electrode film-forming additive, and may further include a performance additive capable of improving specific performance of the battery, for example, a performance additive improving overcharge performance of the battery, a performance additive improving high-temperature or low-temperature performance of the battery, and the like.

[Separator]

The separator is used to separate a positive electrode sheet from a negative electrode sheet. The type of the separator is not particularly limited in the embodiment of the present application, and any known porous separator having good chemical stability and mechanical stability may be used.

A material of the separator may be selected from at least one of glass fibers, nonwoven fabrics, polyethylene, polypropylene, and polyvinylidene fluoride. The separator may be a single-layer thin film or may be a multi-layer composite thin film, which is not particularly limited. When the separator is a multi-layer composite thin film, materials of each layer may be the same or different, which is not particularly limited.

The positive electrode sheet, the negative electrode sheet, and the separator may be formed into an electrode assembly through a winding process or a lamination process.

[Battery Cell]

An embodiment of the present application provides a battery cell including the electrode sheet 1 provided in the above embodiments.

The shape of the battery cell is not particularly limited in the embodiment of the present application, and may be a cylindrical shape, a square shape, or any other shape. The battery cell may be a lithium ion battery, a lithium-sulfur battery, a sodium ion battery, a magnesium ion battery, or the like.

Figure 10:
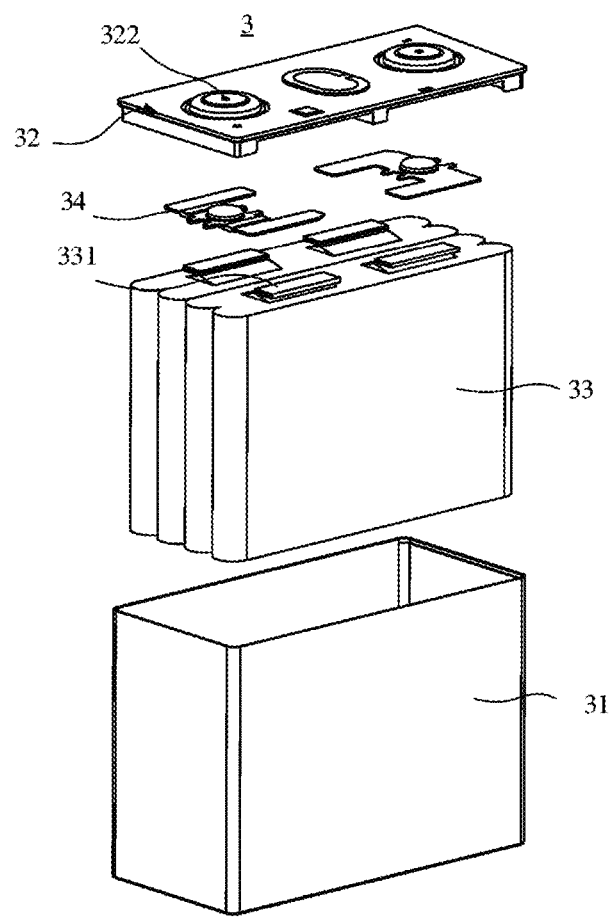
FIG. 10 is a schematic diagram of a battery cell according to an embodiment of the present application.

FIG. 10 is a schematic diagram of a battery cell according to an embodiment of the present application. For example, as shown in FIG. 10, a battery cell 3 is a square battery cell. The battery cell 3 includes a housing 31, an end cap assembly 32, and an electrode assembly 33 disposed in the housing 31.

The electrode assembly 33 may be formed by a positive electrode sheet, a negative electrode sheet, and a separator through a winding process or a lamination process. In some embodiments, the positive electrode sheet is the electrode sheet 1 in the embodiments of the present application.

The end cap assembly 32 includes an electrode terminal 322. For example, as shown in FIG. 10, the end cap assembly 32 includes two electrode terminals 322, one of which is a positive electrode terminal and one of which is a negative electrode terminal.

The battery cell 3 further includes a current collecting member 34 for connecting a tab portion 331 of the electrode assembly 33 and the electrode terminal 322. For example, in a case that the electrode sheet 1 in the embodiments of the present application is a positive electrode sheet, one current collecting member 34 is used to connect a positive electrode tab portion (which may be alternatively the tab 102 of the electrode sheet 1) and a positive electrode terminal, and another current collecting member 34 is used to connect a negative electrode tab and a negative electrode terminal.

In some embodiments, the battery cell may be assembled into a battery module, there may be one or a plurality of battery cells included in the battery module, and those skilled in the art may select a specific quantity based on the application and capacity of the battery module.

[Battery]

Figure 11:
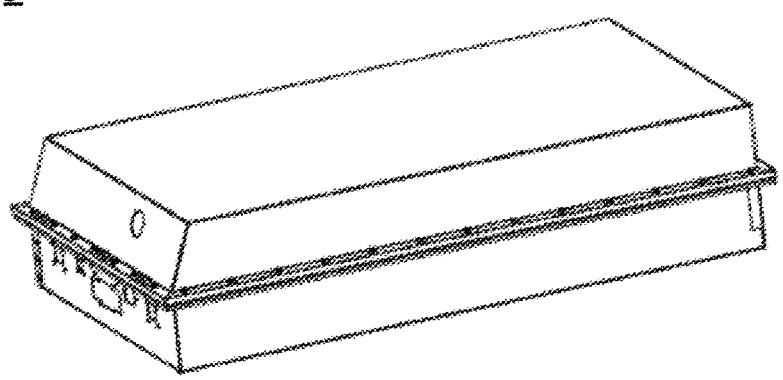
FIG. 11 is a schematic diagram of a battery according to an embodiment of the present application.

An embodiment of the present application provides a battery including the battery cell provided in the above embodiments. FIG. 11 is a schematic diagram of a battery according to an embodiment of the present application. As shown in FIG. 11, a battery 5 may include a plurality of battery cells (not shown in the figure).

The battery cell 3 may directly constitute the battery 5, or may constitute a battery module and then a plurality of battery modules constitute the battery 5.

[Electric Device]

An embodiment of the present application provides an electric device including the battery cell provided in the above embodiments.

Figure 12:
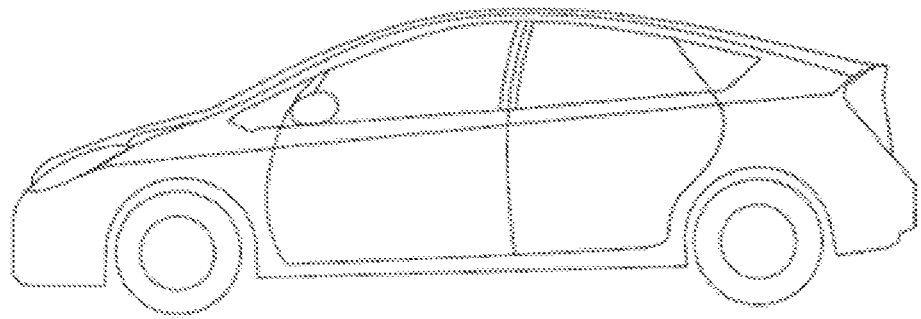
FIG. 12 is a schematic diagram of an electric device according to an embodiment of the present application.

FIG. 12 is a schematic diagram of an electric device according to an embodiment of the present application. As shown in FIG. 12, the present application provides an electric device 6 including the battery in the above embodiments.

Optionally, the electric device may also be an energy storage device, a lighting device, a spacecraft, or the like. The embodiment of the present application includes but is not limited thereto.

Embodiments of the present application are described below. The example described below are illustrative only and are not to be construed as limiting the present application. In the embodiments, specific techniques or conditions are not indicated, and they are performed according to techniques or conditions described in documents in the art or according to the specification of the product. The reagents or instruments used without specifying the manufacturer(s) are conventional products that are commercially available.

EXAMPLES

Example 1

An electrode sheet in Example 1 has a structure as shown in FIG. 2.

In Example 1, volumetric particle size distribution $D_v50$ of a thermoplastic polymer in a second insulating layer is 6 μm, a maximum particle size $D_{max}$ is 90 μm, a material of the thermoplastic polymer is microcrystalline wax, and a drop melting point of the microcrystalline wax is 80° C.

The thickness d2 of the second insulating layer is 30 μm, and the thickness d1 of a first insulating layer was 860 nm.

In the second insulating layer, the mass ratio A:B of the thermoplastic polymer and a binder is 80:20.

Examples 2 to 5

Examples 2 to 5 differ from Example 1 in the volumetric particle size distribution $D_v50$ and the maximum particle size $D_{max}$ of the thermoplastic polymer in the second insulating layer. Specific parameters may be shown in Table 1.

Examples 6 to 9

Examples 6 to 9 differ from Example 1 in the thickness of the second insulating layer.

Accordingly, as the thickness of the second insulating layer changes, the thickness of the first insulating layer and resistance of an end face also change.

Examples 10 to 12

Examples 10 to 12 differ from Example 1 in the material of the thermoplastic polymer.

Accordingly, drop melting points of the thermoplastic polymer are different.

PTFE is polytetrafluoroethylene.

Examples 13 and 14

Examples 13 and 14 differ from Example 1 in the mass ratio of the thermoplastic polymer to the binder in the second insulating layer.

Comparative Example 1

Comparative Example 1 differs from Example 1 in a material of the second insulating layer does not include the thermoplastic polymer, and the material of the second insulating layer includes boehmite.

Comparative Examples 2 and 3

Comparative Example 2 and 3 differ from Example 12 in the volumetric particle size distribution $D_v50$ and the maximum particle size $D_{max}$ of the thermoplastic polymer in the second insulating layer.

Comparative Examples 4 to 6

Comparative Examples 4 to 6 differ from Example 1 in the volumetric particle size distribution $D_v50$ and the maximum particle size $D_{max}$ of the thermoplastic polymer in the second insulating layer.

TABLE 1

Parameters in examples and comparative examples

| | | | | Second insulating layer | | | | |
| --- | --- | --- | --- | --- | --- | --- | --- | --- |
| | | | | | Thermoplastic polymer | | | |
| | d1/nm | R/Ω | d2/μm | Material | $D_v50$ | $D_{max}$ | Drop melting point/°C. | A:B |
| Example 1 | 860 | Infinity | 30 | Microcrystalline wax | 6 | 90 | 80 | 80:20 |
| Example 2 | 860 | Infinity | 30 | Microcrystalline wax | 7 | 100 | 80 | 80:20 |
| Example 3 | 860 | Infinity | 30 | Microcrystalline wax | 8 | 110 | 80 | 80:20 |
| Example 4 | 860 | Infinity | 30 | Microcrystalline wax | 9 | 110 | 80 | 80:20 |
| Example 5 | 860 | Infinity | 30 | Microcrystalline wax | 10 | 110 | 80 | 80:20 |
| Example 6 | 300 | 100 | 22 | Microcrystalline wax | 6 | 90 | 80 | 80:20 |
| Example 7 | 550 | 2000 | 25 | Microcrystalline wax | 6 | 90 | 80 | 80:20 |
| Example 8 | 1300 | Infinity | 40 | Microcrystalline wax | 6 | 90 | 80 | 80:20 |
| Example 9 | 1800 | Infinity | 48 | Microcrystalline wax | 6 | 90 | 80 | 80:20 |
| Example 10 | 860 | Infinity | 30 | Polyamide | 10 | 110 | 250 | 80:20 |
| Example 11 | 860 | Infinity | 30 | Polypropylene | 10 | 110 | 150 | 80:20 |
| Example 12 | 860 | Infinity | 30 | PTFE | 10 | 110 | 110 | 80:20 |
| Example 13 | 860 | Infinity | 30 | Microcrystalline wax | 6 | 90 | 80 | 70:30 |
| Example 14 | 860 | Infinity | 30 | Microcrystalline wax | 6 | 90 | 80 | 60:40 |
| Comparative Example 1 | / | / | 30 | Boehmite | / | / | / | 80:20 |
| Comparative Example 2 | / | / | / | PTFE | 5 | 85 | 110 | / |
| Comparative Example 3 | / | / | / | PTFE | 5 | 90 | 110 | / |
| Comparative Example 4 | 860 at some positions | Infinity at some positions | 30 | Microcrystalline wax | 11 | 105 | 80 | 80:20 |
| Comparative Example 5 | 860 at some positions | Infinity at some positions | 30 | Microcrystalline wax | 6 | 120 | 80 | 80:20 |
| Comparative Example 6 | / | / | / | Microcrystalline wax | 5 | 85 | 80 | / |

TABLE 2

Experimental results of comparative examples and examples

| | Whether to agglomerate | After immersion in an electrolyte solution, whether a fire is caused if a fully charged anode is lap-joined | Whether a fire is caused if a fully charged anode is lap-joined | Whether there is a polymer on an end face |
|---|---|---|---|---|
| Example 1 | No | No fire | No fire | Yes |
| Example 2 | No | No fire | No fire | Yes |
| Example 3 | No | No fire | No fire | Yes |
| Example 4 | No | No fire | No fire | Yes |
| Example 5 | No | No fire | No fire | Yes |
| Example 6 | No | No fire | No fire | Yes |
| Example 7 | No | No fire | No fire | Yes |
| Example 8 | No | No fire | No fire | Yes |
| Example 9 | No | No fire | No fire | Yes |
| Example 10 | No | No fire | No fire | Yes |
| Example 11 | No | No fire | No fire | Yes |
| Example 12 | No | No fire | No fire | Yes |
| Example 13 | No | No fire | No fire | Yes |
| Example 14 | No | No fire | No fire | Yes |
| Comparative Example 1 | / | / | On fire | None |
| Comparative Example 2 | Yes | / | / | / |
| Comparative Example 3 | Yes | / | / | / |
| Comparative Example 4 | No | On fire at some positions | On fire at some positions | Yes |
| Comparative Example 5 | No | On fire at some positions | On fire at some positions | Yes |
| Comparative Example 6 | Yes | / | / | / |

[Preparation of a Battery Cell]

(1) Configuring Slurry for a Second Insulating Coating

A thermoplastic polymer and a binder are mixed at a specific ratio, a solvent is added, and a mixture is stirred uniformly, and viscosity of the slurry is approximately 3000 mPa·s. The binder is polyvinylidene fluoride PVDF and the solvent is N-methylpyrrolidone. A specific thermoplastic polymer and the ratio of the thermoplastic polymer to the binder may be shown in Table 1.

(2) Coating and Drying

An active material layer is prepared when positive electrode active slurry is coated on aluminum foil, where a positive electrode active material in the positive electrode active slurry is $LiNi_{0.8}CO_{0.1}Mn_{0.1}O_2$ (NCM811). The above positive electrode active slurry is coated on the aluminum foil, and the coating width is 3 mm. After drying in an oven, drying temperature is 100° C., and the thickness of the second insulating layer after being dried is shown in Table 1. Here, the thickness of the second insulating layer means the thickness of the second insulating layer on a single side of the current collector.

(3) Laser Die-Cutting

The above product is die-cut, and specific process parameters are shown in Table 1.

(4) Preparing a Battery Cell

The above positive electrode sheet and other assemblies required by a battery, that is, a negative electrode sheet, a separator, and an electrolyte solution, are assembled into a lithium-ion battery cell.

[Confirmation of a First Insulating Layer]

An end face is observed using a scanning electron microscope (SEM) to check whether a first insulating layer is present at the end face. In addition, the thickness of the first insulating layer may also be observed through a photo taken by the scanning electron microscope.

[Confirmation of a Second Insulating Layer]

A surface of an electrode sheet is observed using a scanning electron microscope to check whether a second insulating layer is present on the surface. The electrode sheet is cut, a cross-section of the electrode sheet is photographed by the scanning electron microscope, and the thickness of the second insulating layer is observed through a photographed photo.

[Test of Lapping with a Fully Charged Anode]

An end face that undergoes laser die-cutting is used to lap with the fully charged anode, to observe whether a fire is caused.

[After Immersion in an Electrolyte Solution, Test of Lapping with a Fully Charged Anode]

An electrode sheet obtained after cutting is immersed in an electrolytic solution at 70° C. for 7 days, and an end face obtained after cutting is used to lap with the fully charged anode, to observe whether a fire is caused.

[Test of Performance of Slurry]

In a process of manufacturing coating slurry for the second insulating layer, whether polymer particles in the slurry are agglomerated is observed.

[Test of Resistance of an End Face]

The resistance of the end face may be measured using an ohmmeter.

For example, one end of the ohmmeter is connected to a tab of a positive electrode sheet (specifically, a part of the tab that is not coated with the second insulating layer) in the embodiment, and the other end is connected to a tab of a negative electrode sheet, where an end face of the negative electrode sheet laps over an end face of the positive electrode sheet.

[Test of a Particle Size of a Thermoplastic Polymer]

Volumetric particle size distribution of the thermoplastic polymer may be determined using a particle size analyzer-laser diffraction method. Specifically, reference may be made to the Standard GB/T 19077-2016 using a laser diffraction and scattering particle size analyzer, and measurement is performed according to the manufacturer's operating instructions. For example, before the slurry for the second insulating layer is prepared, an appropriate quantity of thermoplastic polymers are taken and an average volumetric particle size of a material is tested using a MasterSizer 2000 (MasterSizer 2000) laser particle size analyzer. An appropriate quantity of samples to be test (sample concentration between 8% to 12% opacity is ensured), deionized water of 20 ml is added, and sonication is performed for 5 minutes (53 KHz/120 W) to ensure the samples are completely dispersed. Then, the samples are tested according to the standard GB/T19077-2016/ISO 13320:2009.

For another example, the electrode sheet may be tested using a scanning electron microscope to obtain an image of a region of the second insulating layer of the electrode sheet A region of a specific size is selected, and volumetric particle size distribution $D_v50$ and a maximum particle size $D_{max}$ of the thermoplastic polymer are calculated based on the quantity and the size of the thermoplastic polymer in the image.

[Confirmation of a Drop Melting Point of a Thermoplastic Polymer]

The drop melting point of the thermoplastic polymer may be determined according to GB/T8026-2014. For example, a cooled temperature sensor is vertically immersed in a sample, so that the sample adheres to the temperature sensor and is then placed in a test tube and heated at a desired rate of temperature rise to start melting the sample until the first drop of the sample on the sensor is dropped. Temperature of the sensor at this time is a drop melting point of the sample.

For another example, the drop melting point of the thermoplastic polymer may be determined based on a specific thermoplastic polymer after a specific type of the thermoplastic polymer is determined. As an example, a drop melting point of a crystalline thermoplastic polymer is a melting point of the crystalline thermoplastic polymer, and a drop melting point of an amorphous thermoplastic polymer is glass transition temperature of the amorphous thermoplastic polymer.

[Mass Ratio of a Thermoplastic Polymer to a Binder]

The mass ratio of the thermoplastic polymer to the binder may be obtained based on the mass of the thermoplastic polymer and the binder added in a production process.

Figure 13:
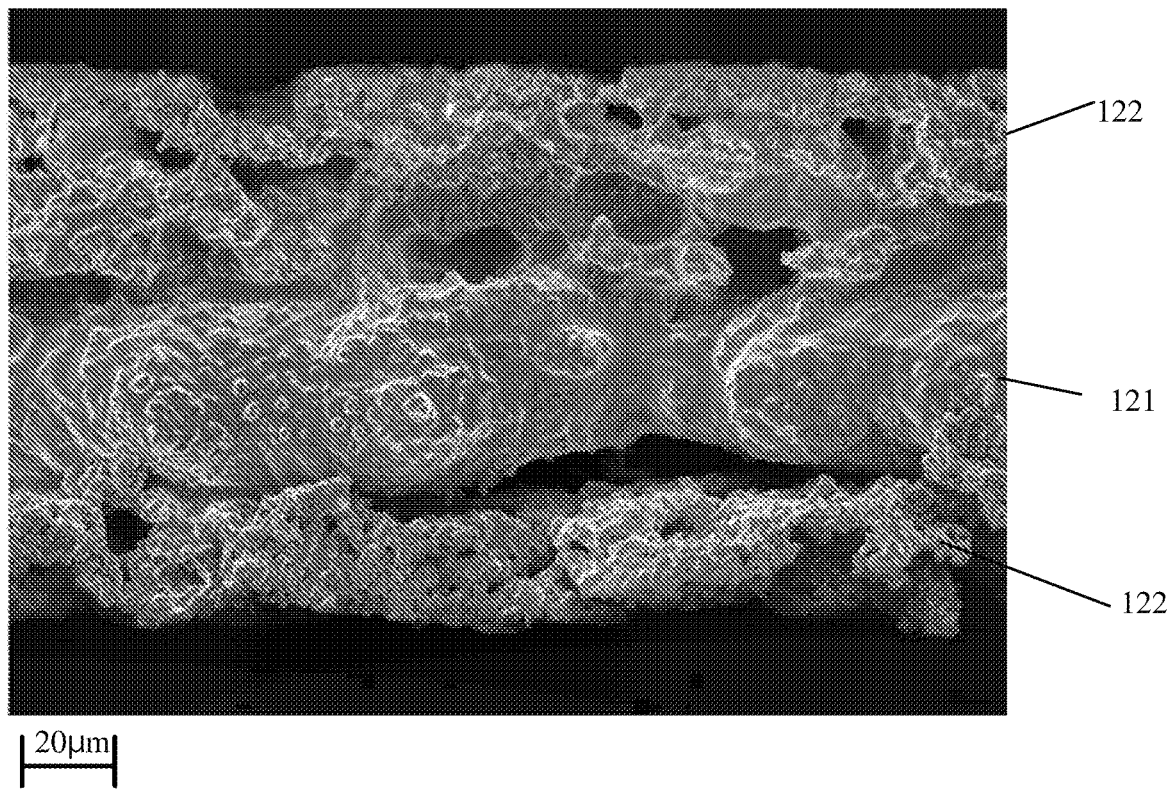
FIG. 13 shows a SEM image of an end face disposed with a first insulating layer according to an embodiment of the present disclosure.

FIG. 13 shows a SEM image of an end face disposed with a first insulating layer according to an embodiment of the present disclosure. Referring to FIG. 13, a first insulating layer 121 is disposed at an end face of an electrode sheet.

It is shown with reference to Examples 1 to 14 and Comparative Example 1 that the first insulating layer is disposed at the end face of the electrode sheet, and after the end face of the electrode sheet laps over a fully charged anode, no fire is caused. Thus, the technical solution of the embodiments of the present application can improve the reliability of a battery cell.

With reference to Examples 1 to 5 and Comparative Example 6 and Example 12 and Comparative Examples 2 and 3, volumetric particle size distribution $D_v50$ of the thermoplastic polymer in the second insulating layer is set to 6 μm to 10 μm, and a maximum particle size $D_{max}$ is set to 90 μm to 110 μm. In a process of preparing a slurry of the second insulating layer, thermoplastic polymers in slurry do not aggregate, thereby facilitating the preparation of the second insulating layer.

With reference to Examples 1 to 5 and Comparative Examples 4 and 5, a maximum particle size $D_{max}$ of the thermoplastic polymer in the second insulating layer is set to 90 μm to 110 μm. In a process of cutting a current collector to prepare a tab, the thermoplastic polymer changes from a solid state to a flowing state, and the thermoplastic polymer in the flowing state has an appropriate flowing path, thereby facilitating flowing to an end face to cover the end face, so as to form a uniform first insulating layer. In this way, no fire is caused when the electrode sheet laps over the fully charged anode, whereas no fire is caused only at some positions in Comparative Examples 4 and 5. In addition, when the electrode sheet laps over the fully charged anode after the electrode sheet is immersed in an electrolyte solution, no fire is caused, whereas no fire is caused only at some positions in Comparative Examples 4 and 5. Thus, when a particle size of the thermoplastic polymer is properly set, it is conducive to improving a density degree of the first insulating layer, thereby facilitating the improvement of an attachment capability of the first insulating layer at the end face. Thus, proper setting of the maximum particle size $D_{max}$ of the thermoplastic polymer in the second insulating layer is conducive to improving the degree of uniformity and density of the first insulating layer, thereby further improving the reliability of a battery cell.

With reference to Examples 6 to 9, the thickness of the second insulating layer is properly set, so that the first insulating layer with an appropriate thickness can be obtained after cutting.

With reference to Examples 10 to 12, the thermoplastic polymer in the second insulating layer may be a variety of materials.

With reference to Examples 13 and 14, the appropriate arrangement of the thermoplastic polymer and the binder in the second insulating layer can be adapted to a variety of different mass ratios.

It should be noted that the present application is not limited to the above-described implementation. The above-described implementation is merely an example, and any implementation having substantially the same configuration as the technical concept and exhibiting the same operation and effect within the scope of the claims of the present application is included in the technical scope of the present application. In addition, various modifications that can be conceived by those skilled in the art may be made to the implementations without departing from the subject matter of the present application, and other implementations constructed by combining some of the constituent elements in the implementations are also included in the scope of the present application.

What is claimed is:

1. An electrode sheet, comprising a current collector, an active material layer, a first insulating layer, and a second insulating layer; wherein
    the current collector comprises a main body portion and a tab, the tab extends from a first end of the main body portion, the first end is an end of the main body portion in a first direction, the main body portion comprises a coated region and a transition region, and the transition region is disposed between the coated region and the tab;
    the active material layer is disposed on a surface of the coated region;
    the first insulating layer is disposed on an end face of the main body portion at the first end; and
    at least part of the second insulating layer is disposed on a surface of the transition region, the second insulating layer comprises a thermoplastic polymer, volumetric particle size distribution $D_v50$ of the thermoplastic polymer is 6 μm to 10 μm, and a maximum particle size $D_{max}$ of the thermoplastic polymer is 90 μm to 110 μm.

2. The electrode sheet according to claim 1, wherein the volumetric particle size distribution $D_v50$ of the thermoplastic polymer is 7 μm to 8 μm, and the maximum particle size $D_{max}$ of the thermoplastic polymer is 90 μm to 100 μm.

3. The electrode sheet according to claim 1, wherein a thickness d2 of the second insulating layer is 22 μm to 48 μm.

4. The electrode sheet according to claim 1, wherein a thickness d1 of the first insulating layer is 300 nm to 1800 nm.

5. The electrode sheet according to claim 1, wherein a drop melting point of the thermoplastic polymer is 80° C. to 250° C.

6. The electrode sheet according to claim 1, wherein a material of the thermoplastic polymer comprises at least one of a crystalline thermoplastic polymer or an amorphous thermoplastic polymer, the crystalline thermoplastic polymer comprises at least one of polyethylene, polypropylene, or polyamide, and the amorphous thermoplastic polymer comprises at least one of microcrystalline wax, polystyrene, or polymethyl methacrylate.

7. The electrode sheet according to claim 1, wherein the second insulating layer further comprises a binder.

8. The electrode sheet according to claim 7, wherein in the second insulating layer, the mass ratio A:B of the thermoplastic polymer to the binder is 60:40 to 80:20.

9. The electrode sheet according to claim 1, wherein resistance R of the end face provided with the first insulating layer satisfies R≥100 Ω.

10. The electrode sheet according to claim 1, wherein the second insulating layer comprises a first part and a second part, the first part is disposed on the surface of the transition region, and the second part extends from the first part in the first direction and is disposed on a partial surface of the tab, wherein in a second direction, end faces of both ends of a region of the tab in which the second part is disposed are disposed with the first insulating layer, and the second direction is different from the first direction.

11. The electrode sheet according to claim 1, wherein a material of the first insulating layer is the same as the material of the thermoplastic polymer in the second insulating layer.

12. The electrode sheet according to claim 1, wherein a thermoplastic polymer in the first insulating layer is in a film-like form, and the thermoplastic polymer in the second insulating layer comprises both the film-like thermoplastic polymer and a particulate thermoplastic polymer.

13. The electrode sheet according to claim 1, wherein the current collector comprises aluminum foil.

14. The electrode sheet according to claim 1, wherein the first insulating layer is further disposed on an end face of the main body portion at a second end, and the second end is opposite to the first end in the first direction.

15. A method for preparing an electrode sheet, characterized by comprising:
providing a current collector;
coating an active material in a first region of the current collector to form an active material layer;
coating insulating slurry in a second region of the current collector to form a second insulating layer, wherein the insulating slurry comprises a thermoplastic polymer and a binder, volumetric particle size distribution $D_v50$ of the thermoplastic polymer is 6 μm to 10 μm, and a maximum particle size $D_{max}$ of the thermoplastic polymer is 90 μm to 110 μm; and
cutting, along a cutting line, the current collector provided with the second insulating layer, wherein at least part of the cutting line is disposed in the second region, wherein the volumetric particle size distribution $D_v50$ of the thermoplastic polymer is 7 μm to 8 μm, and the maximum particle size $D_{max}$ of the thermoplastic polymer is 90 μm to 100 μm, and/or the thickness d2 of the second insulating layer is 22 μm to 48 μm.

16. The method according to claim 15, wherein
a material of the thermoplastic polymer comprises at least one of a crystalline thermoplastic polymer or an amorphous thermoplastic polymer, the crystalline thermoplastic polymer comprises at least one of polyethylene, polypropylene, or polyamide, and the amorphous thermoplastic polymer comprises at least one of microcrystalline wax, polystyrene, or polymethyl methacrylate,
in the insulating slurry, the mass ratio A:B of the thermoplastic polymer to the binder is 60:40 to 80:20, and
the cutting, along a cutting line, the current collector provided with the second insulating layer comprises:
controlling a laser processing tool to cut, along the cutting line, the current collector provided with the second insulating layer.

17. A battery cell, comprising the electrode sheet according to claim 1 and/or an electrode sheet prepared by the method according to claim 15.

18. A battery, comprising the battery cell according to claim 17.

19. An electric device, comprising the battery according to claim 18.

20. The method according to claim 15, wherein a drop melting point of the thermoplastic polymer is 80° C. to 250° C.

* * * * *